United States Patent
Mondal

(10) Patent No.: US 10,204,319 B2
(45) Date of Patent: Feb. 12, 2019

(54) ENTERPRISE SYSTEM AND METHOD FOR FACILITATING COMMON PLATFORM FOR MULTIPLE-USERS WORKING PARALLELY IN ENTERPRISE ENVIRONMENT

(71) Applicant: Wipro Limited, Bangalore (IN)

(72) Inventor: Sumanta Mondal, Kolkata (IN)

(73) Assignee: Wipro Limited, Bangalore (IN)

(*) Notice: Subject to any disclaimer, the term of this patent is extended or adjusted under 35 U.S.C. 154(b) by 7 days.

(21) Appl. No.: 15/452,101

(22) Filed: Mar. 7, 2017

(65) Prior Publication Data
US 2018/0211222 A1 Jul. 26, 2018

(30) Foreign Application Priority Data

Jan. 20, 2017 (IN) .............................. 201741002338

(51) Int. Cl.
| | | |
|---|---|---|
| G06F 9/44 | (2018.01) | |
| G06Q 10/10 | (2012.01) | |
| G06F 8/10 | (2018.01) | |
| G06F 8/30 | (2018.01) | |
| G06F 11/36 | (2006.01) | |
| G06F 8/71 | (2018.01) | |
| G06F 8/35 | (2018.01) | |
| G06F 8/74 | (2018.01) | |
| G06F 8/75 | (2018.01) | |

(52) U.S. Cl.
CPC ............ *G06Q 10/101* (2013.01); *G06F 8/10* (2013.01); *G06F 8/30* (2013.01); *G06F 8/35* (2013.01); *G06F 8/71* (2013.01); *G06F 8/74* (2013.01); *G06F 8/75* (2013.01); *G06F 11/3684* (2013.01); *G06F 11/3688* (2013.01)

(58) Field of Classification Search
CPC .................................................... G06Q 10/101
USPC .................................................. 717/100–102
See application file for complete search history.

(56) References Cited

U.S. PATENT DOCUMENTS

| | | | |
|---|---|---|---|
| 6,553,563 B2 | 4/2003 | Ambrose et al. | |
| 8,191,044 B1* | 5/2012 | Berlik | G06F 11/3672 717/102 |
| 2002/0091990 A1* | 7/2002 | Little | G06F 8/10 717/105 |

(Continued)

OTHER PUBLICATIONS

Kkrieg-Brückner, et al., "The Uniform Workbench a Universal Development Environment for Formal Methods", 1999, pp. 1186-1205, vol. II.

*Primary Examiner* — Chameli Das
(74) *Attorney, Agent, or Firm* — LeClairRyan PLLC

(57) ABSTRACT

Systems and methods for facilitating a common platform for multiple users working parallelly in an enterprise environment are described. When a request is received along with requirements for adding a new feature in an existing application, the system fetches contract information associated with the existing application. The system further provides the contract information to a first user and a second user. Post receiving the contract information and requirements, the first user creates one or more test cases and the second user develops a source code for the feature to be added into the existing application. The system executes the one or more test cases for testing the validity of the source code and further integrates the source code into the existing application.

12 Claims, 4 Drawing Sheets

(56) References Cited

U.S. PATENT DOCUMENTS

| | | | |
|---|---|---|---|
| 2003/0204784 A1* | 10/2003 | Jorapur | G06F 11/3684 714/38.14 |
| 2004/0117759 A1* | 6/2004 | Rippert, Jr. | G06F 8/20 717/100 |
| 2005/0166094 A1* | 7/2005 | Blackwell | G06F 11/3664 714/38.14 |
| 2007/0220370 A1* | 9/2007 | Branda | G06F 11/3688 714/49 |
| 2007/0277158 A1* | 11/2007 | Li | G06F 8/24 717/135 |
| 2010/0250740 A1* | 9/2010 | Cao | G06F 9/54 709/224 |
| 2011/0004565 A1* | 1/2011 | Stephenson | G06Q 10/06 705/348 |
| 2011/0179280 A1* | 7/2011 | Imrey | G06F 8/71 713/178 |
| 2016/0048594 A1* | 2/2016 | Gropper | G06Q 30/02 707/770 |
| 2016/0092348 A1* | 3/2016 | Straub | G06F 11/3684 717/124 |
| 2017/0286192 A1* | 10/2017 | Thomas | G06F 9/546 |

* cited by examiner

ENTERPRISE SYSTEM AND METHOD FOR FACILITATING COMMON PLATFORM FOR MULTIPLE-USERS WORKING PARALLELLY IN ENTERPRISE ENVIRONMENT

This application claims the benefit of Indian Patent Application Serial No. 201741002338 filed Jan. 20, 2017, which is hereby incorporated by reference in its entirety.

FIELD

The present disclosure relates in general to software development. More particularly, but not exclusively, the present disclosure discloses a method and system facilitating a common platform for multiple-users working parallelly on the software development.

BACKGROUND

Software development lifecycle not only includes various phases of the development, but it also engages lot of software professionals at different levels. Since, the various phases have dependencies on each other, the software professionals also have to dependent on each other for their inputs. When the software project moves from one phase to another, it has been observed that one software professional has to wait for the input from other software professional.

The waiting time are sometimes so much long, that the software professional has to struggle a lot for re-collecting the important issues related to that software project when they resume their work. Even if the software professionals are able to re-collect the important issues, another concern is about understanding design pattern and the relationship between different modules or software components across different technologies associated with the software project. The another faced by the software professionals are technology dependency. For example, if a software professional is expert in writing test cases or code in one technology, he/she may not write the same code in different technology. Thus, this makes the process nonflexible and also effects the performance of the team and system as well.

SUMMARY

Accordingly, the present disclosure relates to a method of facilitating a common platform for multiple users working parallelly in an enterprise environment. The method comprises a step of receiving a request for adding a feature in an existing application. The request comprises requirements associated with the feature. The method further comprises fetching contract information associated with the existing application. Further, the method may comprise providing the contract information to a first user and a second user. The method further comprises facilitating the first user to create one or more test cases using the contract information and the requirements associated with the feature. Further, the method comprises facilitating the second user to develop a source code for the feature by using the contract information. The method further comprises performing execution of the one or more test cases. Further, the method comprises performing integration of the source code into the existing application.

Further, the present disclosure relates to an enterprise system for facilitating a common platform for multiple users working parallelly in an enterprise environment. The enterprise system comprises a processor and a memory communicatively coupled to the processor. The memory stores processor-executable instructions, which, on execution, causes the processor to perform one or more operations comprising receive a request for adding a feature in an existing application. The request comprises requirements associated with the feature. The system further fetches contract information associated with the existing application. Further, the system provides the contract information to a first user and a second user. The system further facilitates the first user to create one or more test cases using the contract information and the requirements associated with the feature. The system further facilitates the second user to develop a source code for the feature by using the contract information. Further, the system performs execution of the one or more test cases. The system further performs the integration of the source code into the existing application.

Furthermore, the present disclosure relates to a non-transitory computer readable medium including instructions stored thereon that when processed by at least one processor cause an enterprise system to perform the acts of receiving a request for adding a feature in an existing application. The request comprises requirements associated with the feature. The enterprise system further fetches contract information associated with the existing application. Further, the system provides the contract information to a first user and a second user. The enterprise system further facilitates the first user to create one or more test cases using the contract information and the requirements associated with the feature. The enterprise system further facilitates the second user to develop a source code for the feature by using the contract information. Further, the enterprise system performs execution of the one or more test cases. The enterprise system further performs the integration of the source code into the existing application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
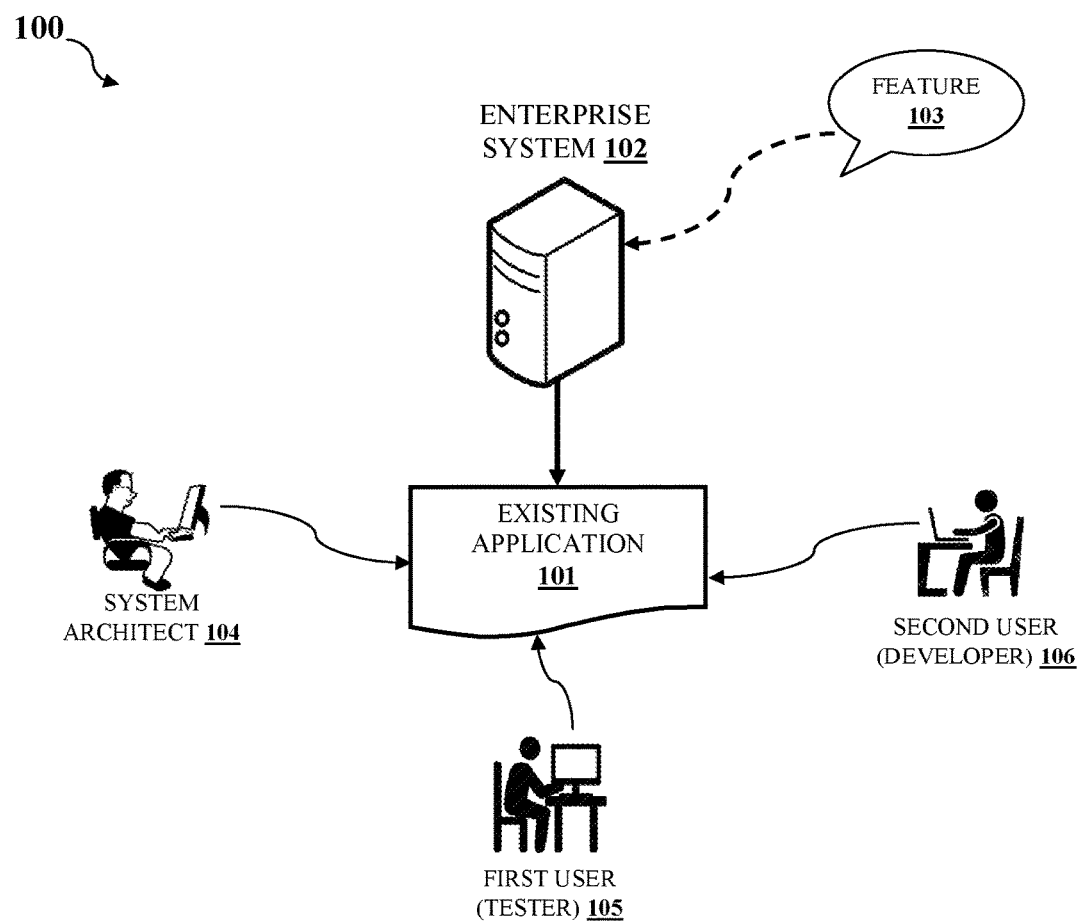
FIG. 1 shows an exemplary environment illustrating an enterprise system for facilitating a common platform for multiple users working parallelly in an enterprise environment in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and system facilitating a common platform for multiple users working parallelly in an enterprise environment. The present invention focusses on scenario, in which, a team of software professionals (developer, tester, system architect or any the member) is working together on an enterprises software or any software project. If a request is received for adding a new feature or a plug-in into an existing application or existing software application, the first step performed by the system is to fetch contract information of that existing application. The contract information is an information about synchronization relationship between the existing application and the new feature to be added into the existing application.

Using the contract information, the software professionals like software tester and software developer may work independently to write test cases and develop source code respectively. Thus, the system provides the common platform for all the software professionals to work parallelly and efficiently. Once the test cases are written and source code is developed, the system may execute the test cases and may further integrate the source code pertaining to the new feature into the existing application. The detail working of the system is explained in subsequent paragraphs of the specification.

The present disclosure relates to a method and an enterprise system (alternatively also referred as "system") for facilitating a common platform for multiple users working parallelly in an enterprise environment. Although, the method for facilitating the common platform is described in conjunction with a server, the said method can also be implemented in various computing systems/devices, other than the server. When a team of software professionals collaboratively works on a software application, the main issue arises in understanding the overall software architecture of the software application and relationship between the different software components of the software application. The team may comprise software architect, software developers, software testers having different levels of experience and expertise.

When a request of adding a new feature or a plug-in into an existing application (or software application upon which the software professionals are currently working) arrives, the first task is to understand the flow of source code associated with the existing application. This understanding helps the team to integrate the new feature in the existing application efficiently and flawlessly. However, it has been observed that understanding the flow of source code becomes difficult for new and existing members in the team. Apart from the understanding issue, another concern is dependency of one member upon another. In a conventional process, the system architect has to collect some pre-requisite information (e.g., contract information) associated with the existing application, and then pass it to other members like software developers and software testers. Till the time the pre-requisite information is collected, the software developers and software testers has to sit idle.

Thus, to address these issues, the present disclosure provides the common platform, on which, all the members involved in the team can parallelly perform their tasks without depending upon each other. When the request for adding the new feature is received, the system fetches the contract information associated with the existing application. The request may comprise one or more requirements which needs to be considered while adding the new feature. After fetching, the system provides the contract information to the other team members (developer and tester) working on the project.

Upon receiving the contract information, at one hand, the software tester may use the contract information and the requirements for creating one or more test cases. Whereas, on other hand, the software developer may use the contract information for developing a source code for the new feature. Thus, the system enables both the members to perform their tasks parallelly and independently without waiting for someone. This not only helps in resource optimization in a team, but it also improves the overall performance of the system. Further, the system executes the one or more test cases for testing the functionality of new feature (or the source code) and also integrate the source code into the existing application, thereby adding the new feature into the existing application.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating an enterprise system for facilitating a common platform for multiple users working parallelly in an enterprise environment.

The environment 100 comprises an existing application 101, the enterprise system 102, feature or a new feature 103 to be added into the existing application 101. The environment 100 also comprises number of software professionals working on a software project, for example the existing application 101. The software professionals may comprise a system architect 104, a first user or a tester 105, and a second user or a developer 106. The software professionals (104, 105 and 106) with their individual computers/computing device are separately connected with the enterprise system 102. The software professionals (104, 105 and 106) may be at same location or remotely located.

The enterprise system 102 receives a request of adding the feature 103 into the existing application 101. The request also comprises one or more requirements associated with the feature 103. In an embodiment, the enterprise system 102 may include, but not limited to, a server, a computer, a workstation, a laptop, mobile phone, or any computing system/device capable of receiving, analysing and processing the useful information.

Figure 2:
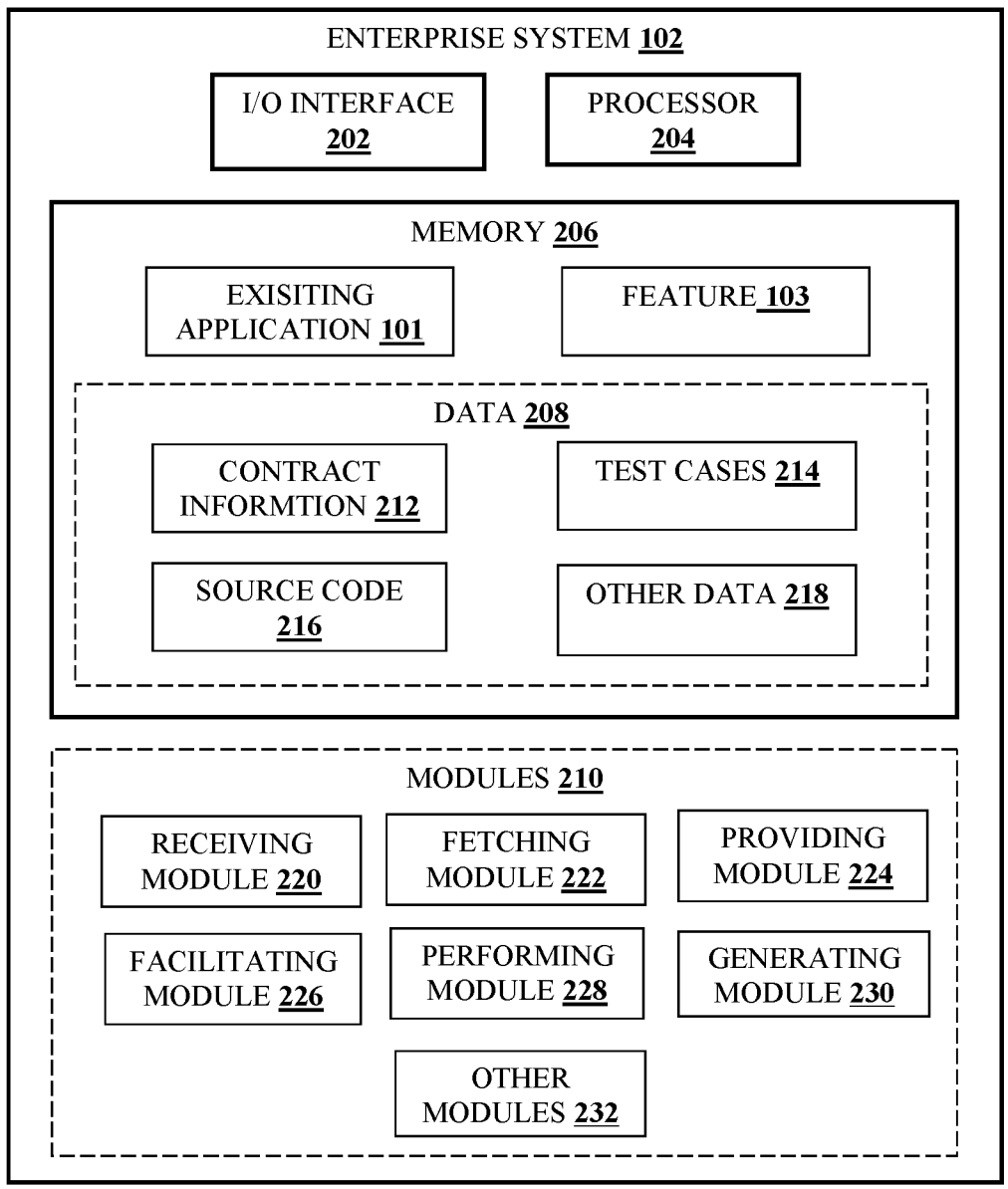
FIG. 2 shows a detailed block diagram illustrating the enterprise system in accordance with some embodiments of the present disclosure.

FIG. 2 shows a detailed block diagram illustrating the enterprise system in accordance with some embodiments of the present disclosure.

The enterprise system 102 comprises an I/O interface 202, a processor 204 and a memory 206. The I/O interface 202 is configured to receive one or more data, for example, the request for adding the feature 103 into the existing application 101. The memory 206 is communicatively coupled to the processor 204. The processor 204 is configured to perform one or more functions of the enterprise system 102 for facilitating a common platform for the multiple users (104, 105 and 106) working parallelly in the enterprise environment. In one implementation, the enterprise system 102 comprises data 208 and modules 210 for performing various operations in accordance with the embodiments of the present disclosure. The memory 206 further comprises the existing application 101 and the feature 103. In an embodiment, the data 208 may include, without limitation, contract information 212, test cases 214, source code 216 and other data 218.

In one embodiment, the data 208 may be stored within the memory 206 in the form of various data structures. Additionally, the aforementioned data 208 can be organized using data models, such as relational or hierarchical data models. The other data 218 may store data, including temporary data and temporary files, generated by modules 210 for performing the various functions of the enterprise system 102.

In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the enterprise system 102.

In one implementation, the one or more modules 210 may include, without limitation, a receiving module 220, a fetching module 222, a providing module 224, a facilitating module 226, a performing module 228, a generating module 230 and other modules 232. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the receiving module 220 may receive a request for adding a feature 103 in an existing application 101. The existing application 101 may be any software application or a software product on which the software professionals may be currently working. In the enterprise environment, the number of software professionals are engaged in different activities of the software development like planning, development, testing, deploying and the like. Each professional has its own role or task which he/she performs during the software development.

In a conventional software development life cycle (SDLC) process, the software professionals have to depend upon each other for pre-requisite information. Also, the professionals use to spend lot of time to understand an overall structure/architecture of software code associated with the existing application 101 on which they are working. The time consumption increases and understanding becomes complex when a new member joins the team. Being as the new member, he/she may be unaware about the flow of the software code or relationship amongst different software components defined in the existing application 101. Even, sometimes, the existing members may face the time and the complexity issue while understanding the overall scenario of the project.

To deal with such situation faced in the conventional SDLC process, the present disclosure discloses the enterprise system 102 which provides the common platform for enabling multiple software professionals (104, 105 and 106) to work parallelly and independently on a project. When the request for adding the feature 103 is received along with the requirements, the system architect 104 may ask the first user 105 (software tester) to create one or more test cases and the second user 106 (software developer) to develop source code corresponding to the feature 103. However, the requirements received along with the feature 103 may not be sufficient for creating the test cases and for developing the source code. As conventionally known, the software tester 105 and software developer 106 has to wait for the system architect 104 for his/her input. Till the time the input is provided, the software tester 105 and software developer 106 remains idle for that particular project.

However, the enterprise system 102 disclosed in the present disclosure eliminates the dependency of receiving the input from the system architect 103. This is because, once the request is received, the fetching module 222 of the system 102 automatically fetches contract information 212 associated with the existing application 101. The contract information 212 is fetched by using an in-built lexical analyzer (i.e., Lex) and a parser (Yacc).

Further, the generating module 230 of the system 102 may generate pictorial representation of the existing application 101. Before generating the pictorial representation, the first task of the enterprise system 102 is to efficiently store and organize source code of the existing application 101 so that required data could be easily fetched from a file system. The enterprise system 102 may 102 parse the source code of the existing application 101 into number of small blocks. These blocks are stored in the file system along with file systems' indexes which is further used while retrieving the data from the file system. According to an embodiment, to make the file system data management more efficient, data cashing may be used. Thus, the data caching enables to store the frequently used data in a memory rather than storing them into disk.

Further, the enterprise system 102 performs static and dynamic analysis of the source code of the existing application 101 to generate high level abstract model. For generating the pictorial representation i.e., Unified Modeling Language (UML) diagram, the generating module 230 may parse the source code of the existing application and performs reverse engineering by using the UML. The UML diagram generated may comprise at least one of a class diagram, a component diagram, a package diagram, sequence diagram, and communication diagram. According to embodiments, the UML diagram may be defined using a metamodeling approach. The purpose of generating the UML diagram is to help the system architect 104, the software tester 105 and the software developer 106 or any other software professional involved in the project to understand about how the various software components of the existing application 101 interacts with each other. The UML diagram gives an overview about the relationship between the various software components. In order words, the UML diagram provides a blue-print of the architecture of the existing application 101. The enterprise system 102 may further convert the UML diagram which is associated with a particular technology into a source code of another technology. This makes the enterprise system 102 platform-independent and provides handshaking between different technologies.

The software tester 105 and the software developer 106 may proceed with their individual tasks by getting the overview from the UML diagram and by using the contract information 212. The contract information 212 may be provided, by the providing module 224, to the software tester 105 and the software developer 106. The contract information 212 may serve as a mandatory requirement for creating the test cases and for developing the source code 216 for the feature 103. This is because, the contract information 212 provides a synchronization relationship between the existing application 101 and the feature 103.

Once the contract information 212 is provided to the software tester 105 and the software developer 106, the facilitating module 226 of the system 102 may facilitate the software tester 105 (i.e., first user) to create one or more test cases by using the contract information 212 and the requirements associated with the feature 103. Further, the facilitating module 226 may also facilitate the software developer 106 to develop the source code 216 for the feature 103 by using the contract information 212.

While developing the source code 216, the enterprise system 102 may perform static analysis and may suggest/recommend syntactically correct code piece for the software developer 106. Further, the enterprise system 102 may also suggest or recommend one or more suitable or best fitted design patterns to the software developer 106. The design patterns are suggested/recommended by sensing development scenarios, for example, technology or domain in which the source code 216 is being developed. Also, the context of the exiting application 101 and the feature 103 is considered for suggesting/recommending the design patterns. According to embodiments, a plurality of design patterns may be stored in the enterprises system 102. When the software developer 106 starts developing the source code 216, the enterprise system 102 may search for the best fitted design patterns amongst the plurality of design patterns based on the context of the exiting application 101 and the feature 103. Thus, the overall code quality of the source code 216 is enhanced.

On the other hand, the enterprise system 102 may parallelly engage the software tester 105 for creating the one or more test cases. The generating module 230 of the enterprise system 102 may generate unit test framework in a particular technology being used by the software tester 105. By using the unit test framework and the contract information 212, the software tester 105 may create the one or more unit test cases for testing. In a scenario, in which, the development of the source code 216 has not yet started from the software developer 106, all the test cases created may be marked red indicating the current scenario to the software tester 105. Once the development starts from the software developer's 105 end, the enterprise system 102 changes the color from red to green. This helps in understanding the current situation and achieving team velocity by optimum resource allocation. The one or more test cases created may be at least one of a positive test case and a negative test case. Another advantage of parallelly engaging the software tester 105 and software developer 106 is that, the enterprise system 102 may determine growth-rate of each individual graphically. This may help in effectively engaging the individuals in next project.

Once the source code 216 of the feature 103 is developed, generating module 230 of the system 102 may generate the UML diagram corresponding to the source code 216 of the feature 103. Thus, the generating module 230 of the system 102 generates the UML diagram for both i.e., for source code of the existing application 101 and the source code 216 of the feature 103 by using reverse engineering. Post generating the UML diagrams, the performing module 228 of the enterprise system 102 may execute the one or more test cases to check the functionality of source code 216. The performing module 228 may further integrate the source code 216 of the feature 103 into the existing application 101. This way, the enterprise system 102 addresses the request by adding the feature 103 into the existing application 101.

According to embodiments of present disclosure, the UML diagram may be received as an input instead of the source code by the enterprise system 102. In this scenario, the enterprise system 102 may compare the UML diagram with standard definition of basic high-level components, for example, class, method, relation and the like. Further, the enterprise system 102 may compute meta model from the high-level model component. The meta model is the definition of the high-level model component. This way, the system architect 104 or the software developer 106 get the pictorial representation of independent abstract layer in the UML diagram. While determining the meta model, if any error is occurred, the enterprise system 102 may seek input from the system architect 104 or the software developer 106 to provide a correct high level abstract model (UML).

Now, when the validity of the UML input is confirmed, the system architect 104 or the software developer 106 may choose a particular technology from the enterprise system 102. Based on the chosen technology, the enterprise system 102 may generate compiled code using a forward engineering process. The compiled code may be integrated to existing legacy code already present in the enterprise system 102.

Figure 3:
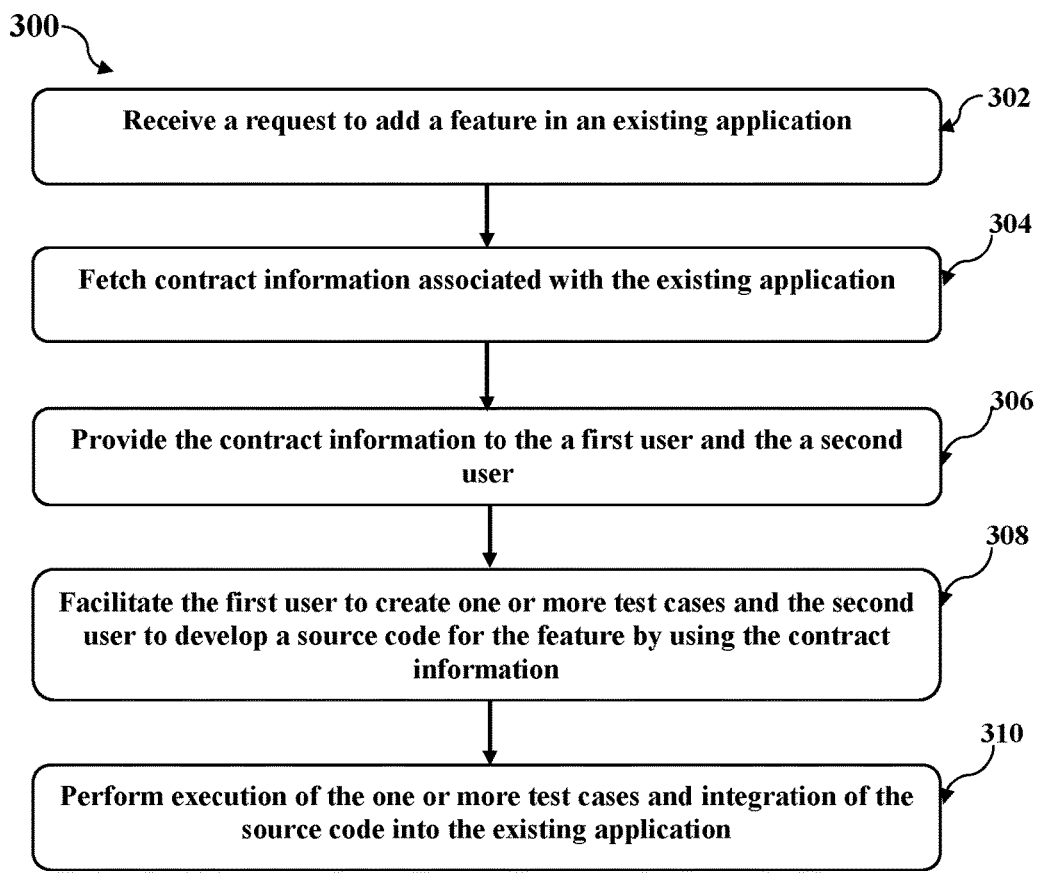
FIG. 3 shows a flowchart illustrating a method of facilitating a common platform for multiple users working parallelly in an enterprise environment in accordance with some embodiments of the present disclosure.

FIG. 3 shows a flowchart illustrating a method of facilitating a common platform for multiple users working parallelly in an enterprise environment with some embodiments of the present disclosure.

As illustrated in FIG. 3, the method 300 comprises one or more blocks for facilitating a common platform for multiple users using an enterprise system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the enterprise system 102 receives a request for adding a feature 103 in an existing application 101. The request comprises requirements associated with the feature 101.

At block 304, the enterprise system 102 fetches contract information 212 associated with the existing application 101. The contract information 212 is fetched by using a lexical analyzer and a parser. Further, the contract information 212 is indicative of a synchronization relationship between the existing application 101 and the feature 103.

At block 306, the enterprise system 102 provides the contract information 212 to a first user 105 (i.e., the software tester) and a second user 106 (i.e., software developer).

At block 308, the enterprise system 102 facilitate the first user 105 (i.e., the software tester) to create one or more test cases using the contract information 212 and the requirements associated with the feature 103. Further, the enterprise system 102 also facilitates the second user 106 (i.e., software developer) to develop a source code 216 for the feature 103 by using the contract information 212.

At block 310, the enterprise system 102 performs execution of the one or more test cases. Further, the enterprise system 102 also performs the integration of the source code 216 into the existing application 101.

Computer System

Figure 4:
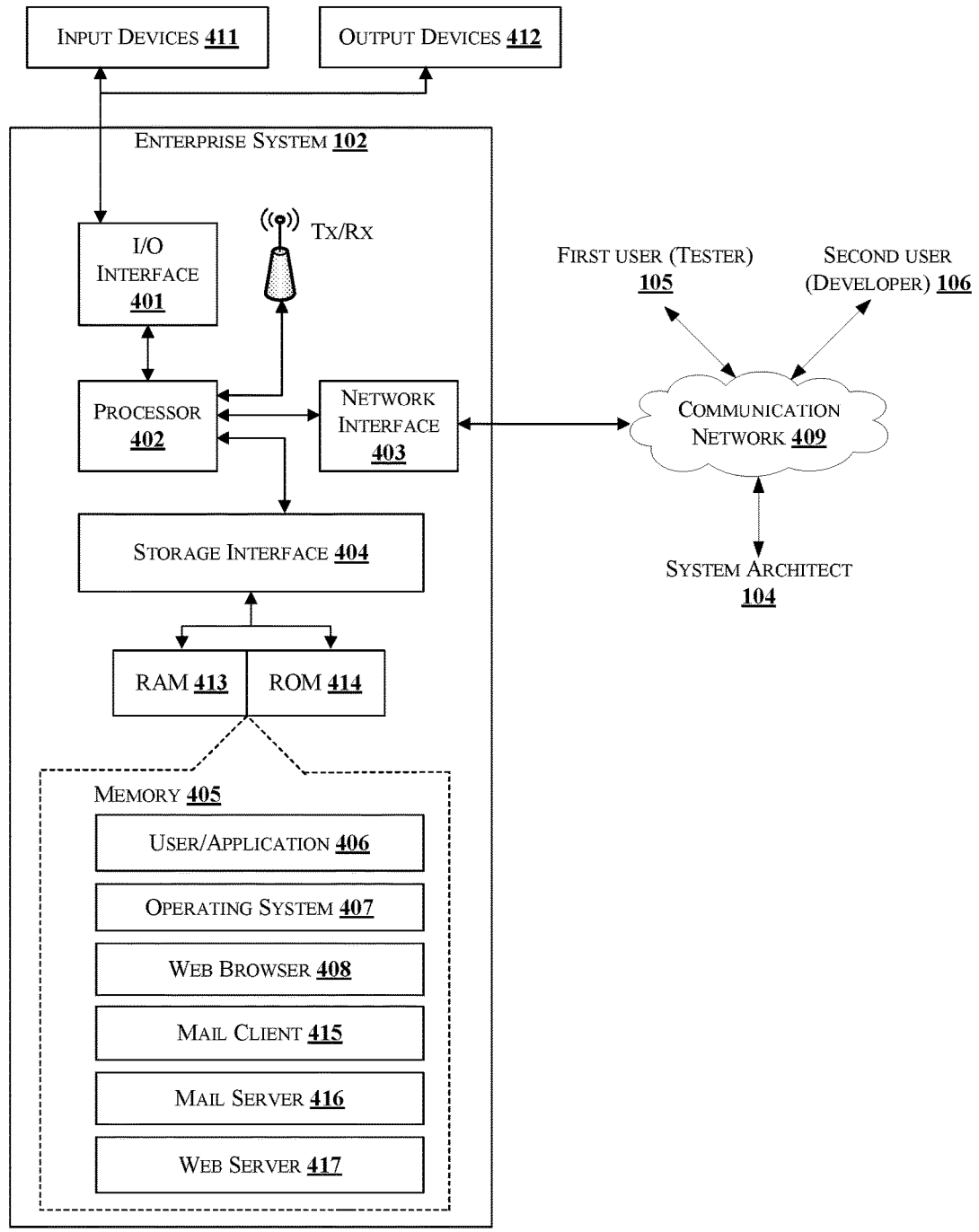
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the enterprise system 102 which is used for facilitating a common platform for multiple users working parallelly in an enterprise environment. According to an embodiment, the computer system 400 may receive a request comprising a feature 103 to be added into an existing application 101 from a user/client. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as ORACLE or SYBASE.

The operating system 407 may facilitate resource management and operation of the computer system 400. Examples of operating systems include, without limitation, APPLE MACINTOSH OS X, UNIX, UNIX-like system distributions (e.g., BERKELEY SOFTWARE DISTRIBUTION (BSD), FREEBSD, NET BSD, OPEN BSD, etc.), LINUX distributions (e.g., RED HAT, UBUNTU, K-UBUNTU, etc.), INTERNATIONAL BUSINESS MACHINES (IBM) OS/2, MICROSOFT WINDOWS (XP, VISTA/7/8, etc.), APPLE IOS, GOOGLE ANDROID, BLACKBERRY Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH operating systems' AQUA, IBM OS/2, MICROSOFT WINDOWS (e.g., AERO, METRO, etc.), UNIX-X-

WINDOWS, web interface libraries (e.g., ACTIVEX, JAVA, JAVASCRIPT, AJAX, HTML, ADOBE FLASH, etc.), or the like.

In some embodiments, the computer system 400 may implement a web browser 408 stored program component. The web browser may be a hypertext viewing application, such as MICROSOFT INTERNET EXPLORER, GOOGLE CHROME, MOZILLA FIREFOX, APPLE SAFARI, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, ADOBE FLASH, JAVASCRIPT, JAVA, Application Programming Interfaces (APIs), etc. In some embodiments, the computer system 400 may implement a mail server stored program component. The mail server may be an Internet mail server such as MICROSOFT EXCHANGE, or the like. The mail server may utilize facilities such as Active Server Pages (ASP), ACTIVEX, American National Standards Institute (ANSI) C++/C#, MICROSOFT .NET, CGI scripts, JAVA, JavaScript JAVASCRIPT, PERL, PHP, PYTHON, WebObjects, etc. The mail server may utilize communication protocols such as Internet Message Access Protocol (IMAP), Messaging Application Programming Interface (MAPI), MICROSOFT EXCHANGE, Post Office Protocol (POP), Simple Mail Transfer Protocol (SMTP), or the like. In some embodiments, the computer system 400 may implement a mail client stored program component. The mail client may be a mail viewing application, such as APPLE MAIL, MICROSOFT EXCHANGE, MICROSOFT OUTLOOK, MOZILLA THUNDERBIRD, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method facilitating a common platform for multiple users working parallelly in an enterprise environment.

In an embodiment, the method of present disclosure provides managing and optimizing resource utilization.

In an embodiment, the method of present disclosure enhances the overall performance of the system, since the multiple users or the software professionals interacts with the system independently.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of facilitating a common platform for multiple users working parallelly in an enterprise environment, the method comprising:
   receiving, by an enterprise system, a request for adding a feature in an existing application, wherein the request comprises requirements associated with the feature;
   fetching, by the enterprise system, contract information associated with the existing application, wherein the contract information is indicative of a synchronization relationship between the existing application and the feature;
   providing, by the enterprise system, the contract information to a first user and a second user;
   facilitating, by the enterprise system, the first user to create one or more test cases using the contract information and the requirements associated with the feature, and the second user to develop a source code for the feature by using the contract information;
   generating, by the enterprise system, a pictorial representation of the existing application and the source code, the pictorial representation comprising one or more unified modeling language (UML) diagrams;

performing, by the enterprise system, execution of the one or more test cases, and integration of the source code into the existing application; and facilitating, by the enterprise system, the first and second users to perform one or more respective tasks in parallel using the UML diagrams and the contract information.

2. The method as claimed in claim 1, wherein the one or more test cases are at least one of a positive test case and a negative test case.

3. The method as claimed in claim 1, wherein the contract information is fetched by using a lexical analyzer and a parser.

4. The method as claimed in claim 1, further comprising recommending one or more design patterns to the second user for developing the source code, wherein the one or more design patterns are recommended based on context of the feature and the existing application.

5. An enterprise system for facilitating a common platform for multiple users working parallelly in an enterprise environment, the system comprising:
a processor; and
a memory communicatively coupled to the processor, wherein the memory stores processor-executable instructions, which, on execution, causes the processor to:
receive a request for adding a feature in an existing application, wherein the request comprises requirements associated with the feature;
fetch contract information associated with the existing application wherein the contract information is indicative of a synchronization relationship between the existing application and the feature;
provide the contract information to a first user and a second user;
facilitate the first user to create one or more test cases using the contract information and the requirements associated with the feature, and the second user to develop a source code for the feature by using the contract information;
generate a pictorial representation of the existing application and the source code, the pictorial representation comprising one or more unified modeling language (UML) diagrams;
perform execution of the one or more test cases, and integration of the source code into the existing application; and
facilitate the first and second users to perform one or more respective tasks in parallel using the UML diagrams and the contract information.

6. The enterprise system as claimed in claim 5, wherein the one or more test cases are at least one of a positive test case and a negative test case.

7. The enterprise system as claimed in claim 5, wherein the contract information is fetched by using a lexical analyzer and a parser.

8. The enterprise system as claimed in claim 5, wherein the processor is further configured to recommend one or more design patterns to the second user for developing the source code, wherein the one or more design patterns are recommended based on context of the feature and the existing application.

9. A non-transitory computer-readable storage medium including instructions stored thereon that when processed by at least one processor cause an enterprise system to perform operations comprising:
receiving a request for adding a feature in an existing application, wherein the request comprises requirements associated with the feature;
fetching contract information associated with the existing application; wherein the contract information is indicative of a synchronization relationship between the existing application and the feature;
providing the contract information to a first user and a second user;
facilitating the first user to create one or more test cases using the contract information and the requirements associated with the feature, and the second user to develop a source code for the feature by using the contract information;
generating a pictorial representation of the existing application and the source code, the pictorial representation comprising one or more unified modeling language (UML) diagrams;
performing, execution of the one or more test cases, and integration of the source code into the existing application; and
facilitating the first and second users to perform one or more respective tasks in parallel using the UML diagrams and the contract information.

10. The medium as claimed in claim 9, wherein the one or more test cases are at least one of a positive test case and a negative test case.

11. The medium as claimed in claim 9, wherein the contract information is fetched by using a lexical analyzer and a parser.

12. The medium as claimed in claim 9, wherein the instructions further cause the at least processor to recommend one or more design patterns to the second user for developing the source code, wherein the one or more design patterns are recommended based on context of the feature and the existing application.

* * * * *